United States Patent
Behm et al.

(10) Patent No.: US 11,398,651 B2
(45) Date of Patent: Jul. 26, 2022

(54) BATTERY MODULE, METHOD FOR THE PRODUCTION THEREOF, AND BATTERY

(71) Applicant: Robert Bosch GmbH, Stuttgart (DE)

(72) Inventors: Henrik Wolfgang Behm, Stuttgart (DE); Lisa Lorenz, Stuttgart (DE); Sinasi Temiz, Ebersbach (DE); Stefan Baumann, Altenriet (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 15/811,601

(22) Filed: Nov. 13, 2017

(65) Prior Publication Data

US 2018/0138563 A1 May 17, 2018

(30) Foreign Application Priority Data

Nov. 14, 2016 (DE) ..................... 10 2016 222 264.3

(51) Int. Cl.
| | |
|---|---|
| *H01M 10/613* | (2014.01) |
| *H01M 10/653* | (2014.01) |
| *H01M 10/6551* | (2014.01) |
| *H01M 10/6556* | (2014.01) |
| *H01M 10/659* | (2014.01) |
| *H01M 10/04* | (2006.01) |
| *H01M 50/20* | (2021.01) |
| *H01M 50/24* | (2021.01) |
| *H01M 10/0525* | (2010.01) |

(52) U.S. Cl.
CPC ..... *H01M 10/613* (2015.04); *H01M 10/0481* (2013.01); *H01M 10/653* (2015.04); *H01M 10/659* (2015.04); *H01M 10/6551* (2015.04); *H01M 10/6556* (2015.04); *H01M 50/20* (2021.01); *H01M 50/24* (2021.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2012/0177970 | A1* | 7/2012 | Marchio | H01M 2/0237 429/120 |
| 2012/0231313 | A1* | 9/2012 | Kumar | H01M 10/6551 429/120 |
| 2013/0004822 | A1* | 1/2013 | Hashimoto | H01M 10/6556 429/120 |
| 2014/0322582 | A1* | 10/2014 | Ruter | H01M 50/20 429/120 |

(Continued)

FOREIGN PATENT DOCUMENTS

| | | |
|---|---|---|
| CN | 102859785 A | 1/2013 |
| CN | 103314478 A | 9/2013 |

(Continued)

*Primary Examiner* — Dustin Q Dam
(74) *Attorney, Agent, or Firm* — Michael Best & Friedrich LLP

(57) ABSTRACT

A battery module having a battery module housing (2) which has a multiplicity of housing walls (3) which form an interior space (4), wherein a multiplicity of battery cells (22) is arranged in the interior space (4), and the battery module housing (2) furthermore has a cooling element receptacle (5), wherein a cooling element (12) of the battery module (1) is arranged in the cooling element receptacle (5) of the battery module housing (2).

25 Claims, 5 Drawing Sheets

(56) References Cited

U.S. PATENT DOCUMENTS

2016/0093932 A1* 3/2016 Obasih .............. H01M 10/6562
429/120

FOREIGN PATENT DOCUMENTS

| | | |
|---|---|---|
| CN | 103579713 A | 2/2014 |
| CN | 103682516 A | 3/2014 |
| CN | 104868072 A | 8/2015 |
| CN | 105027349 A | 11/2015 |
| CN | 105304839 A | 2/2016 |
| DE | 102010055600 | 6/2012 |
| DE | 102010055600 A1 | 6/2012 |
| DE | 102011007315 | 10/2012 |
| DE | 102011007315 A1 | 10/2012 |
| DE | 112012000438 | 10/2013 |
| DE | 102013206504 | 10/2014 |
| DE | 102013206504 A1 | 10/2014 |
| DE | 102015206182 A1 | 11/2015 |
| EP | 2456003 | 5/2012 |
| EP | 2456003 A1 * | 5/2012 ............ H01M 50/20 |

* cited by examiner

BATTERY MODULE, METHOD FOR THE PRODUCTION THEREOF, AND BATTERY

BACKGROUND OF THE INVENTION

The invention relates to a battery module and to a method for the production thereof. The present invention also relates to a battery having a battery module of said type.

From the prior art, it is known that batteries, in particular lithium-ion batteries, are composed of at least one battery module or advantageously of a multiplicity of battery modules. Furthermore, a battery module also preferably has a multiplicity of individual battery cells, which are interconnected with one another to form the battery module. Here, the individual battery cells may be connected in series or in parallel with one another.

Ageing processes owing to charging and discharging processes in the individual battery cells give rise to internal forces, which have the effect that the individual battery cells do not remain constant in terms of shape over the service life, it rather being the case that these processes, referred to as swelling, deform the housing of the battery cells. These processes thus necessitate a design of the battery module which can withstand the internal forces that are generated owing to ageing processes and which can limit the deformation of the housings of the individual battery cells. Applying a force to the individual battery cells or to the housings thereof in order to limit the deformation and maintain function of the individual battery cells is generally referred to as compression.

Furthermore, during operation, the individual battery cells warm up owing to their internal resistance when an electrical current flows, wherein the heat that is generated must be dissipated in order to avoid a decrease in performance owing to excessively high temperatures. Here, the prior art has disclosed so-called passive cooling arrangements, comprising for example cooling fins arranged on the outer side of the housing, and so-called active cooling arrangements, comprising for example cooling elements through which a cooling liquid flows.

A housing that accommodates the battery cells of the battery module should be both capable of securing the battery cells against slippage in any direction and capable of dissipating the heat that is generated during operation.

The document DE 10 2013 206 504 A1 discloses a battery module with a thermally conductive compensation coating, which is intended to compensate an offset between the battery cells.

Furthermore, the document DE 10 2011 007 315 A1 has disclosed a battery with a cooling element which is of thermally conductive form and which comprises a cooling body with cooling fins.

Furthermore, the document DE 10 2010 055 600 A1 discloses a cooling device which comprises a latent heat store.

SUMMARY OF THE INVENTION

The battery module and the method for the production thereof according to the invention have the advantage that reliable mechanical fixing of a multiplicity of battery cells in the battery module, and an efficient dissipation of heat from the battery module, are possible. Here, in particular, it is possible for the formation of air-filled cavities owing to production-induced tolerances between the battery cells and a cooling element of the battery module to be reduced or even prevented entirely. In this way, the heat transfer between the battery cells and the cooling element is advantageously increased, and an amount of heat that can be dissipated from the battery module is thus also increased overall. It is also thereby advantageous that reliable mechanical fixing of the battery cells in a battery module housing of the battery module is possible in particular by means of the cooling element, such that additional measures for fixing can be omitted.

For this purpose, a battery module having a battery module housing is provided. The battery module housing has a multiplicity of housing walls which form an interior space. Here, a multiplicity of battery cells is arranged in the interior space of the battery module housing. Furthermore, the battery module housing forms a cooling element receptacle or has a cooling element receptacle. Here, a cooling element of the battery module is arranged in the cooling element receptacle of the battery module housing.

Here, according to a first embodiment according to the invention, the cooling element receptacle is formed as an opening running through one of the housing walls.

According to a second embodiment according to the invention, a housing wall arranged directly adjacent to the cooling element receptacle has a smaller wall thickness than the housing walls surrounding the cooling element receptacle.

It is advantageously the case that, in the second embodiment according to the invention, the housing wall which is arranged directly adjacent to the cooling element and which is in particular also arranged between the multiplicity of battery cells and the cooling element has a multiplicity of openings which are formed so as to run through said housing wall.

Here, the openings have, in particular, cross-sectional areas of circular form which each have a diameter of preferably 2 mm to 20 mm and more preferably of 4 mm to 10 mm.

It is self-evidently also possible for the cross-sectional areas to have other geometrical shapes, in particular to each have an elliptical shape, a square shape, a rectangular shape or a triangular shape. Here, the cooling element receptacle is in particular advantageously designed such that the cooling element arranged in the cooling element receptacle completely covers the openings to the surroundings of the battery module. In this way, a reliable mechanical connection of the cooling element in the cooling element receptacle, and adequate heat transfer, can be realized. Here, it is expedient in particular for the openings to be arranged uniformly over the housing wall which is arranged directly adjacent to the cooling element, for example along multiple rows which point in the longitudinal direction of the housing wall arranged directly adjacent to the cooling element.

It is expedient if the battery module housing is formed from a first material and the cooling element is formed from a second material which differs from the first material. Here, the second material exhibits higher thermal conductivity than the first material. In particular, the first material may for example be a plastic or else a multi-component composite material which comprises a plastic. Furthermore, in particular, the second material may be a metallic material. In this way, owing to the cooling element which is formed separately from the battery module housing being received in the cooling element receptacle, it is advantageously possible for the battery module housing to be formed for example from an electrically insulating material with a low weight, in particular a plastic or a multi-component composite material, and for the cooling element to be formed for example from a material with relatively high thermal conductivity, such as a metal, preferably aluminum, steel or copper. The cooling element may in this case advantageously be formed as an extruded profile. Altogether, it is thus possible for the heat that can be dissipated from the battery module housing to the surroundings to be increased in relation to the battery module housing known from the prior art and formed from plastic.

Here, metallic cooling elements in particular exhibit increased efficiency in relation to cooling elements formed from plastic.

According to one advantageous aspect of the invention, the cooling element is cohesively connected to the cooling element receptacle. In particular, the cooling element is in this case preferably connected to the cooling element receptacle by adhesive bonding, wherein welded or brazed forms of the connection are also possible.

According to a further aspect of the invention, the cooling element is connected to the cooling element receptacle in positively locking fashion. In particular, the cooling element is in this case connected to the cooling element receptacle by screwed connection, clipped connection or riveted connection. Furthermore, the cooling element and the cooling element receptacle may for example also have mutually corresponding detent elements, guide rails or receiving elements.

According to a yet further advantageous aspect of the invention, the cooling element is connected to the cooling element receptacle in non-positively locking fashion. In particular, the cooling element is in this case connected to the cooling element receptacle by calking. A calked, non-positively locking connection of said type may be formed for example by means of an expansion, known as heat staking or thermoplastic staking, in the case of which the battery module housing is heated and the cooling element is subsequently received in the cooling element receptacle, or conversely also by virtue of the cooling element being cooled before being received in the cooling element receptacle. It is self-evidently also possible for the abovementioned advantageous aspects to be combined with one another, such that the cooling element may be connected to the cooling element receptacle in cohesive and/or positively locking and/or non-positively locking fashion.

Altogether, it is possible by means of the abovementioned advantageous aspects, or also by means of a combination thereof, for a reliable mechanical connection to be formed between the cooling element and the cooling element receptacle.

In particular, it is also advantageous if a sealing element is arranged between the cooling element and the cooling element receptacle. In this way, the interior space of the battery module housing can be sealed off with respect to the surroundings, such that contaminants cannot enter the battery module housing from the surroundings, and it is also not possible for hazardous substances, such as for example an electrolyte or other substances that may escape from the battery cells, to pass out of the battery module housing into the surroundings. In particular, it is also possible in this way to prevent coolant from entering the battery module housing.

It is furthermore possible, according to a particularly advantageous refinement of the battery module housing, for a compensation element to additionally be arranged between the cooling element and the multiplicity of battery cells that are arranged in the interior space of the battery module housing. A compensation element of said type is in this case advantageously formed from an electrically insulating material in order to prevent undesired short-circuit currents or undesired electrical contacting.

Furthermore, the compensation element is advantageously formed from a material with a relatively high thermal conductivity, whereby it is possible for the heat transfer from the battery cells to the cooling element, and thus the total amount of heat dissipated from the battery module, to be increased, because, by contrast to battery module housings known from the prior art, the formation of air-filled gaps between the battery cells and the cooling element can be reduced or even prevented entirely, whereby the effect of the air, which limits the overall thermal conductivity, is reduced. In this way, it is advantageously possible for the thermal conductivity between the cooling element and the battery cells to be increased overall.

In other words, the compensation element is as far as possible in direct contact in each case with the multiplicity of battery cells and the cooling element, specifically in particular as far as possible over the entire available surfaces thereof, which are in particular arranged directly opposite one another, such that a defined heat transfer between the battery cells and the cooling element is realized.

Furthermore, the compensation element may advantageously also comprise an elastic and/or plastics fraction, in order to thus be able to compensate shock and vibration loads acting on the battery module and reduce the effect of said loads on the functionality of the battery cells, whereby it is in particular also the case that reliable mechanical fixing of the battery cells is possible by means of the compensation element pressed against the battery cells by the cooling element.

Here, it is furthermore expedient if the compensation element comprises a thermally conductive adhesive, whereby not only an increase in the thermal conductivity but also a reliable mechanical connection between the cooling element and the cooling element receptacle, or also the battery cells and the cooling element receptacle, or also the battery cells and the cooling element, can be realized.

Here, it is furthermore also expedient for the compensation element to comprise a thermally conductive sealing compound, whereby not only an increase in thermal conductivity but also sealing of the battery module housing can be achieved.

The thermally conductive adhesive, or the thermally conductive sealing compound, may in this case comprise for example pasty materials or hardening materials.

Here, the compensation element may furthermore be formed from an electrically insulating material such as for example a thermoplastic, an elastomer or a thermoplastic elastomer. In particular, the compensation element may in this case also be formed as a foil or as a multi-layer foil, such as for example a dielectric foil. At this juncture, a foil is to be understood to mean an elastic, areal component which is deformable under the action of gravitational force alone.

The compensation element may for example also form an interior space which can be filled with a fluid, in particular a temperature-control fluid, such that the thermal conductivity can thereby be increased. Furthermore, that wall of the compensation element which surrounds the interior space may also be of flexible form, such that, as a result of the introduction of the fluid, in particular at a pressure high enough to deform the flexible wall, it is for example possible for reliable, full-surface contact to be realized between the compensation element and the cooling element and between the compensation element and the battery cells.

It is advantageous if the cooling element has at least one cooling fin, whereby a reliable dissipation of heat by means of free convection or forced convection, that is to say for example a dissipation of heat to air surrounding the battery module or to air flowing around the battery module, is possible.

It is furthermore advantageous if the cooling element forms at least one flow duct through which a temperature-control fluid can flow, whereby a reliable dissipation of heat is possible by means of a controllable and/or regulable active cooling system.

It is furthermore advantageous if the cooling element has at least one latent heat store which comprises a phase change material and which can absorb the heat that is generated during operation.

According to a preferred exemplary embodiment, a compressing element compresses the multiplicity of battery cells arranged in the interior space of the battery module housing. Here, it is pointed out at this juncture that it is expedient not for the battery module housing to form the compressing element, but rather for the compressing element to be formed separately from the battery module housing. For example, the compressing element may be a tension strap, a tension belt or frame elements arranged in each case at edges of the battery module. This has the overall advantage that the multiplicity of battery cells can be additionally pressed together by means of the compressing element and also inserted in the compressed state into the battery module housing, and reliable thermally conductive contact, which can simultaneously also serve for fixing of the battery cells, can first be realized as a result of the cooling element being received in the cooling element receptacle.

The invention also relates to a method for producing a battery module as described above.

Here, in a first step, a battery module housing having a multiplicity of housing walls which form an interior space and furthermore having a cooling element receptacle is provided. Here, according to a first embodiment according to the invention, the cooling element receptacle may be formed as an opening running through one of the housing walls. Here, according to a second embodiment according to the invention, the cooling element receptacle may be designed such that a housing wall arranged directly adjacent to the cooling element receptacle has a smaller wall thickness than the housing walls surrounding the cooling element receptacle.

Furthermore, in the first step, a multiplicity of battery cells and a cooling element are provided.

Then, in a second step, the multiplicity of battery cells is arranged in the interior space of the battery module housing.

In a third step, the cooling element is then arranged in the cooling element receptacle of the battery module housing.

Such a method according to the invention for producing the battery module has the advantage in particular that, owing to the fact that the cooling element is arranged in the cooling element receptacle after the multiplicity of battery cells has already been arranged in the battery module housing, air-filled cavities between the cooling element and the battery cells can be minimized or even prevented entirely.

In the third step, it is advantageously furthermore the case that a compensation element is arranged between the cooling element and the multiplicity of battery cells.

Furthermore, the invention also relates to a battery having a described battery module according to the invention, which is produced in particular by means of a described method according to the invention.

Overall, a battery module according to the invention firstly has the advantage that, owing to the realization of contact over as large an area as possible, a reliable dissipation of heat from the battery cells to the surroundings of the battery module is possible, and secondly has the advantage that the battery cells can be reliably fixed in the battery module housing by means of a cooling element which presses against the battery cells and/or the compensation element. Furthermore, in particularly preferred embodiments, a compensation element may be arranged between the battery cells and the cooling element, whereby air-filled cavities are at least partially filled.

BRIEF DESCRIPTION OF THE DRAWINGS

Exemplary embodiments of the invention are illustrated in the drawings and will be discussed in more detail in the following description.

In the drawings.

DETAILED DESCRIPTION

Figure 1:
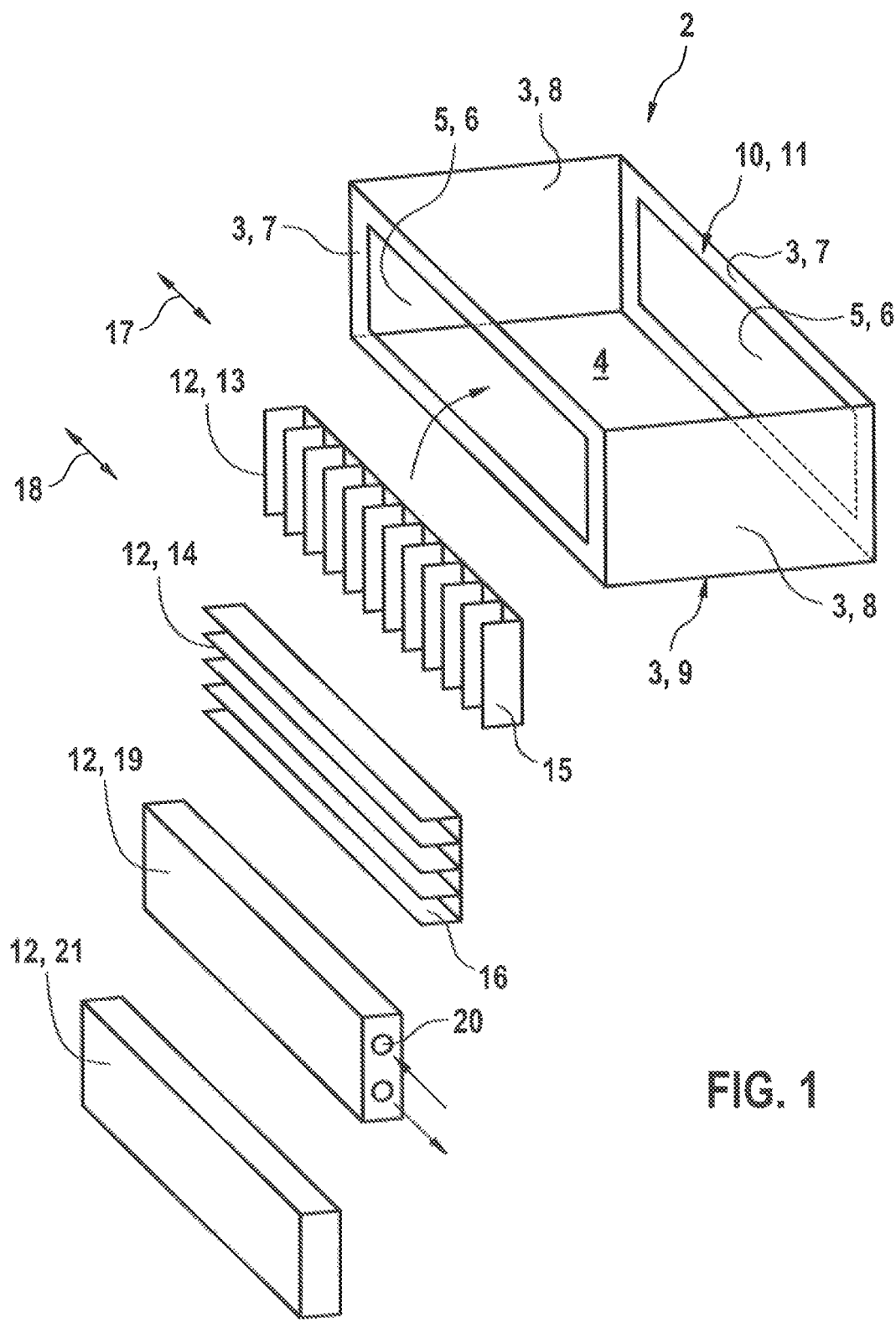
FIG. 1 schematically shows, in a perspective view, an embodiment of a battery module housing with different embodiments of a cooling element of a first battery module according to the invention, FIG. 2 schematically shows, in a sectional view, a first embodiment of a battery module according to the invention, FIG. 3 schematically shows, in a perspective view, an embodiment of a battery module housing of a second battery module according to the invention, FIG. 4 schematically shows, in a side view, a second embodiment of a battery module according to the invention, and FIG. 5 schematically shows, in a sectional view, a second embodiment of a battery module according to the invention.

FIG. 1 schematically shows, in a perspective view, a battery module housing 2 of a battery module 1 according to the invention. Here, the battery module housing 2 has a multiplicity of housing walls 3 which form an interior space 4.

Here, the interior space 4 is designed to accommodate a multiplicity of battery cells 22 (not shown in FIG. 1) of the battery module 1.

The battery module housing 2 furthermore has a cooling element receptacle 5. In particular, the battery module housing 2 shown in FIG. 1 has two cooling element receptacles 5. In the first embodiment of the invention shown in FIG. 1, the cooling element receptacle 5 is formed as an opening 6 running through one of the housing walls 3. In particular, the cooling element receptacle 5 may in this case preferably be arranged on a side surface 7 of the battery module housing 2 in order to form as large as possible a contact area between the battery cells 22 and a cooling element 12. Furthermore, the cooling element receptacle 5 may self-evidently also be formed on a face surface 8 of the battery module housing 2, or formed on a base surface 9 of the battery module housing 2.

The battery module housing 2 preferably has, on a top side 10, an opening 11 through which the battery cells 22 (not shown in FIG. 1) can be inserted into the battery module housing 2. It is furthermore preferable for the opening 11 arranged on the top side 10 to be closed off, after the battery cells 22 have been received, by means of a cover element (not shown in FIG. 1), wherein the cover element comprises in particular electrical elements, such as for example cell connectors, or electronics elements, for example a printed circuit board, a control unit or temperature sensors, of the battery module 1, and said cover element can form a seal of the battery module housing 2 with respect to the surroundings.

FIG. 1 furthermore shows four different embodiments of a cooling element 12 which can be arranged in each case in the cooling element receptacle 5. In particular, the battery module housing 2 is formed from a plastic, and the cooling element 12 is formed from a metallic material, whereby the heat transfer coefficient with respect to the surroundings can be considerably improved in comparison to battery module housings 2 known from the prior art, which are formed only from plastic.

The illustrated embodiment of a first cooling element 13 and the illustrated embodiment of a second cooling element 14 have in each case a multiplicity of cooling fins 15, 16. Here, the first cooling element 13 and the second cooling element 14 differ in that the cooling fins 15 of the first cooling element 13 are arranged perpendicular to the longitudinal direction 17 of the first cooling element 13, and the cooling fins 16 of the second cooling element 14 are arranged perpendicular to the longitudinal direction 18 of the second cooling element 14. Here, in the state in which the cooling element 12 is received in the cooling element receptacle 5, the longitudinal directions 17, 18 should point from one face surface 8 to another face surface 8 of the battery module housing 2. Furthermore, the cooling fins 15, 16 may also have other shapes or geometries which can serve for enlarging the surface of the cooling element 12 in order to thereby increase the dissipation of heat.

The illustrated embodiment of a third cooling element 19 has flow ducts 20 through which temperature-control fluid can flow. At this juncture, it is pointed out that a cooling element 19 of said type may for example also be formed from plastic.

The illustrated initial form of a fourth cooling element 21 has a latent heat store which comprises at least one phase change material. At this juncture, it is pointed out that a cooling element 21 of said type may also be formed from plastic.

The illustrated cooling elements 12 can furthermore also be arranged in all other embodiments according to the invention of a battery module 1, which will in particular be described below.

At this juncture, the form of the cooling element receptacle 5 will be discussed once again in detail. As can be seen from FIG. 1, the opening 6 has a smaller area than the side surface 7 which has the cooling element receptacle 5, such that wall regions of the side surface 7 not occupied by the opening 6 can increase the mechanical stability of the battery module housing 2.

Here, the opening 6 is in particular formed such that the opening 6 is surrounded by wall regions of the side surface 7 in encircling fashion. In FIG. 1, the battery module housing 2 has two pairs of in each case mutually oppositely situated wall regions of the side surface 7 which surround the rectangular opening 6. In particular, the battery module housing 2 has a cuboidal overall basic shape, whereby prismatic battery cells 22 can be arranged therein with a high level of space utilization, and whereby the wall region surrounding the opening 6 ensures a greater level of stability.

Figure 2:
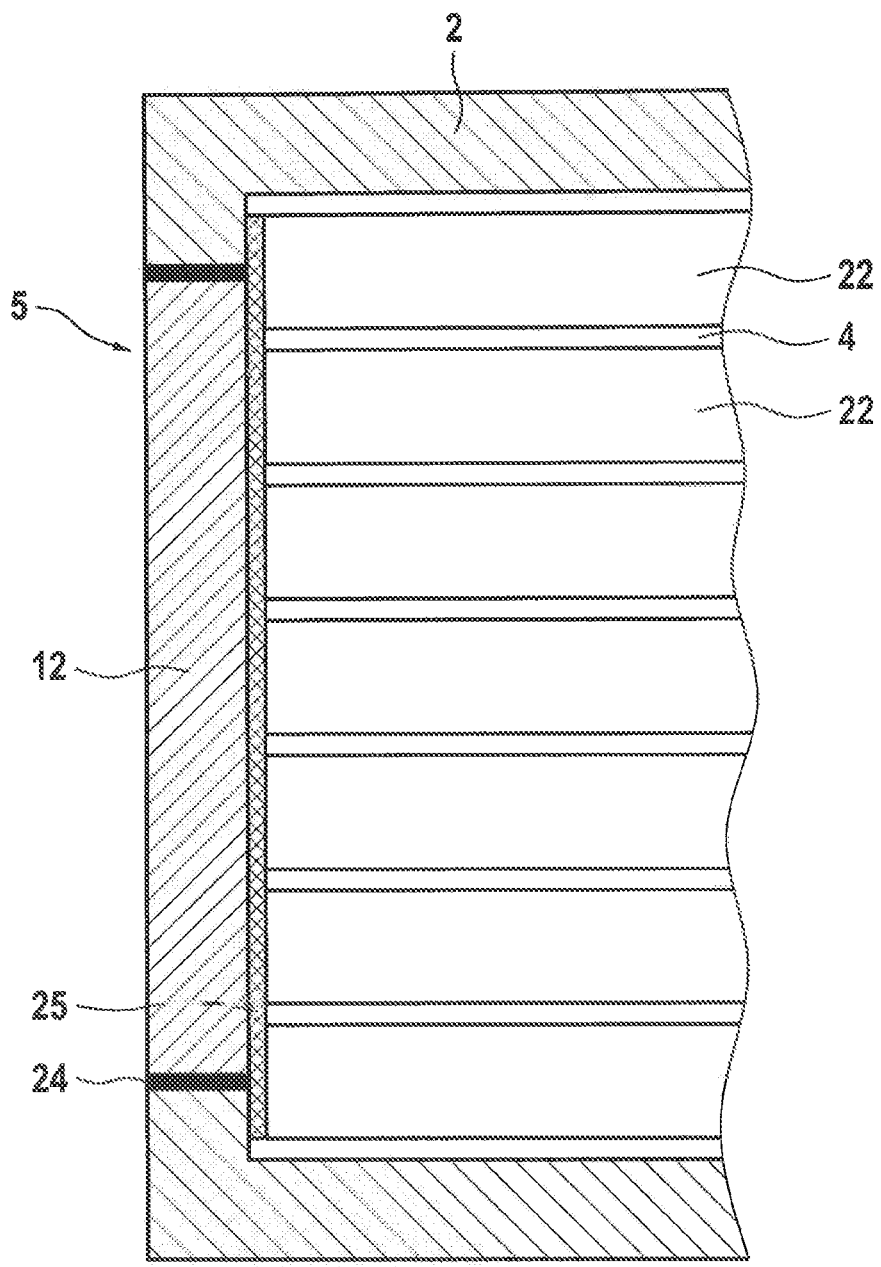

FIG. 2 schematically shows, in a sectional view, a first embodiment of a battery module 1 according to the invention.

Here, a multiplicity of battery cells 22 is arranged in the battery module housing 2, wherein the battery module housing 2 may correspond to the battery module housing 2 shown in FIG. 1.

In particular, the battery cells 22 shown in FIG. 2 are of prismatic form and are arranged in the battery module housing 2 such that voltage taps arranged on a top side of the battery cells 22 are arranged at the top side 10 of the battery module housing 2 and can thus, for example by means of cell connectors arranged on a cover element, be electrically interconnected with one another in series or in parallel, which cannot be seen in FIG. 2 because said figure shows a sectional view.

FIG. 2 furthermore also shows that the battery cells 22 are arranged in the battery module housing 2 such that in each case the relatively small side surfaces of the battery cells 22 of prismatic form are arranged directly adjacent to the cooling element 12 which is arranged in the cooling element receptacle 5.

It can furthermore also be seen from FIG. 2 that a sealing element 24 may additionally be arranged between the cooling element 12 and the battery module housing 2 in order to seal off the interior space 4 with respect to the surroundings.

Furthermore, FIG. 2 also shows that a compensation element 25 may be arranged between the battery cells 22, in particular the relatively small side surfaces thereof, and the cooling element 12.

At this juncture, the advantage of a first battery module 1 according to the invention will also be discussed once again in detail on the basis of FIG. 2.

As a result of the cooling element 12 being formed as a component separate from the battery module housing 2, it is possible for the battery cells 22 to be arranged in the battery module housing 2 and then, as a result of the cooling element 12 subsequently being received in the cooling element receptacle 5, wherein the cooling element 12 is for example pressed against the battery cells 22 and/or against the compensation element 25, to form contact over as large an area as possible, in particular also by means of the compensation element, because production-induced tolerances can be compensated in a straightforward manner.

Figure 3:
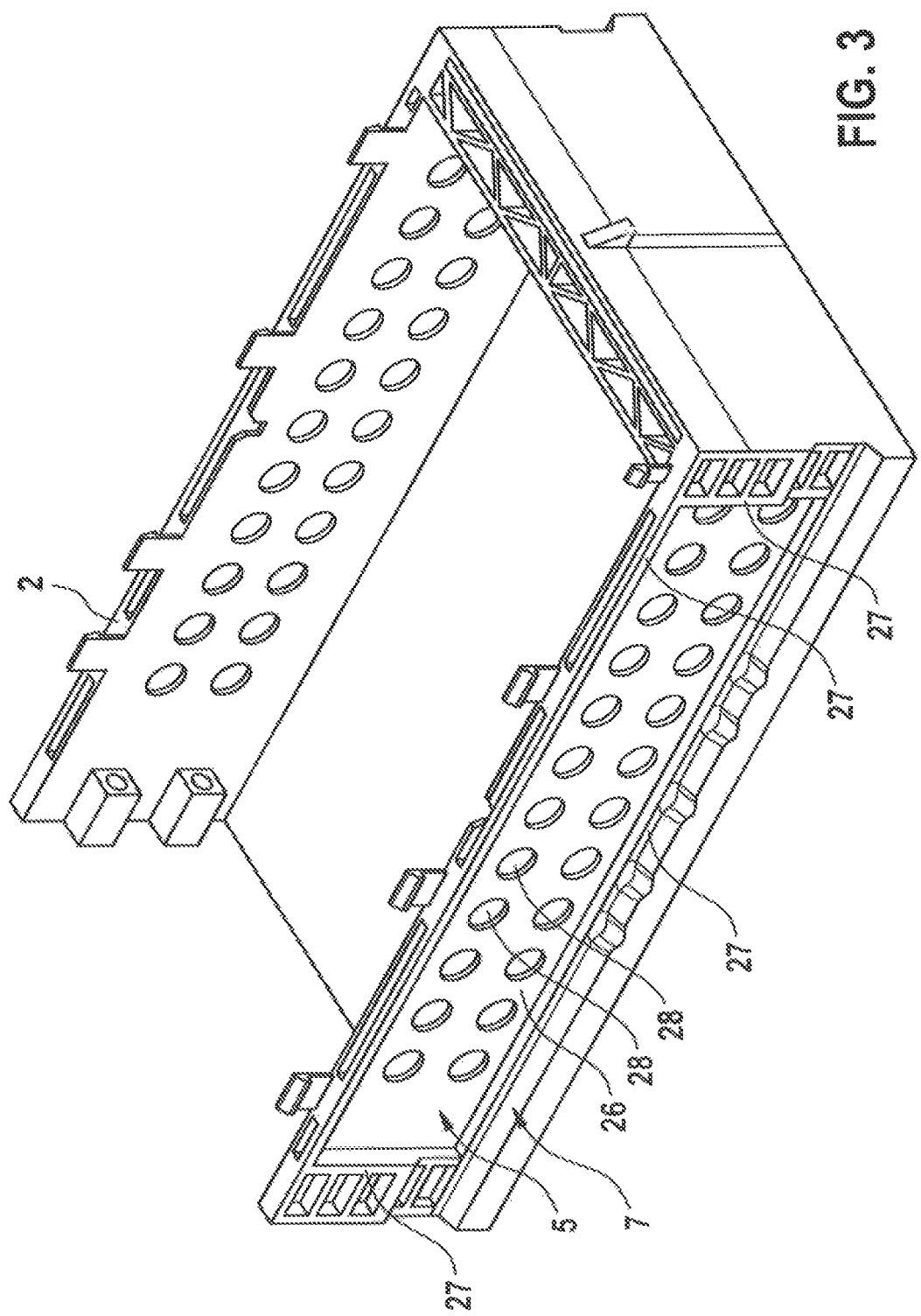

FIG. 3 schematically shows, in a perspective view, a second embodiment of a battery module housing 2 according to the invention, which differs from the battery module housings 2 shown in FIGS. 1 and 2 in particular by the form of the cooling element receptacle 5.

Here, a housing wall 26 arranged directly adjacent to the cooling element receptacle 5 has a smaller wall thickness than the housing walls 27 surrounding the cooling element receptacle 5. At this juncture, it is pointed out that the housing wall 26 arranged directly adjacent to the cooling element receptacle 5 is intended to refer to that housing wall which, after the arrangement of the cooling element 12, is arranged directly adjacent to one of the relatively large side surfaces of the cooling element 12 and is in particular also arranged directly between the cooling element 12 and the battery cells 22.

Furthermore, FIG. 3 shows that the housing wall 26 arranged directly adjacent to the cooling element receptacle 5 of the battery module housing 2 has a multiplicity of openings 28 which are formed so as to run through said housing wall. Here, the openings 28 advantageously each have cross-sectional areas of circular form.

In particular, the housing walls 27 surrounding the cooling element receptacle 5 and the housing wall 26 directly adjacent to the cooling element receptacle 5 are in each case wall regions of the same housing wall of the battery module housing 2, in particular of a side wall 7 of the battery module housing 2. This will be discussed in more detail once again in conjunction with FIG. 5.

Figure 4:
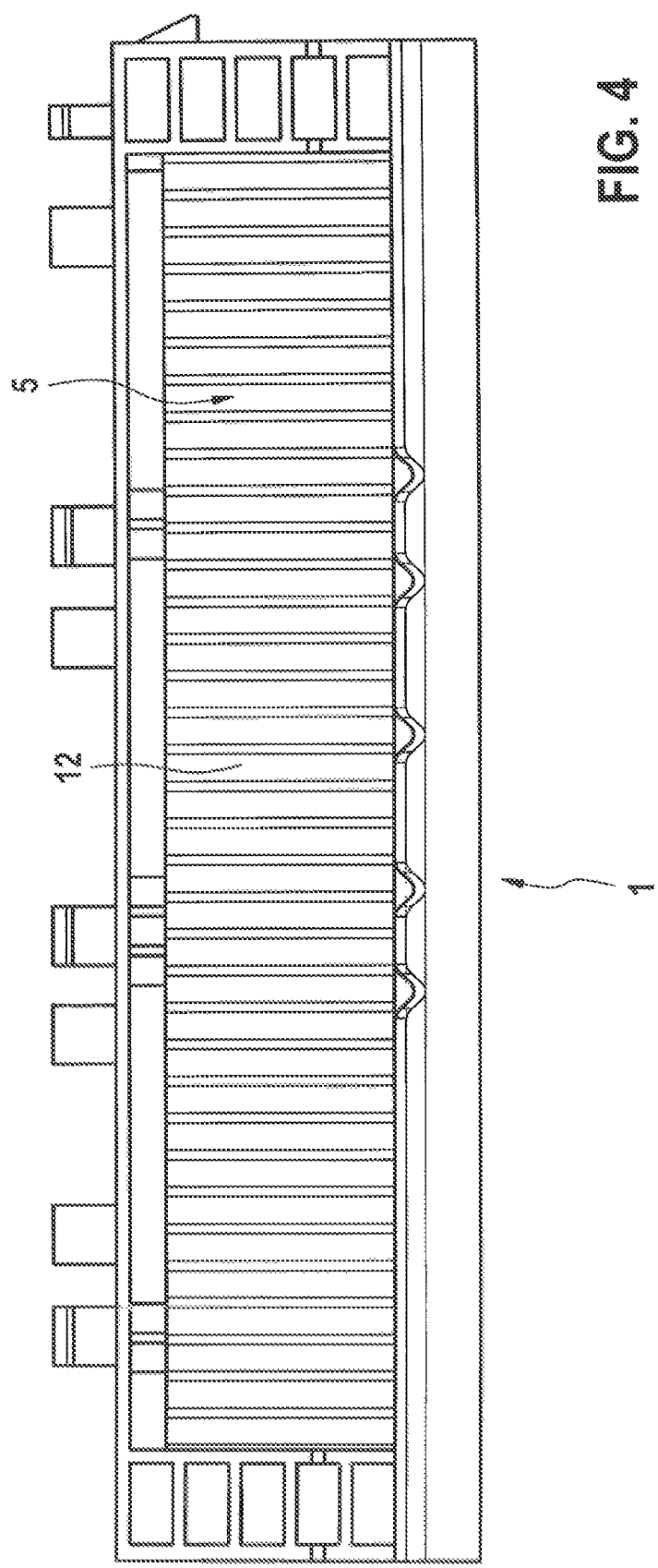

FIG. 4 schematically shows, in a side view, a second embodiment of a battery module 1 according to the invention, with a cooling element 12 arranged in the cooling element receptacle 5. Here, a compensation element 25 may be arranged between the cooling element 12 and the battery cells 22 received in the interior space 4 of the battery module housing 2. In particular, in the embodiment as per FIGS. 3 and 4, and FIG. 5 which is to be described in more detail further below, the compensation element 25 is a thermally conductive adhesive or a thermally conductive sealing compound. In this way, in particular, the openings 28 shown in FIG. 3 are filled with the compensation element 25.

In particular in the case of the compensation element 25 being formed as a thermally conductive adhesive, it is thereby possible for the cooling element 12 to be reliably mechanically connected to the housing wall 26 arranged directly adjacent to the cooling element receptacle 5, such that the housing wall 26 arranged directly adjacent to the cooling element receptacle 5 permits a reliable mechanical arrangement of the cooling element 12, and the compensation element 25 simultaneously makes it possible for reliable, thermally conductive contact to be formed between the cooling element 5 and the battery cells 22.

Figure 5:
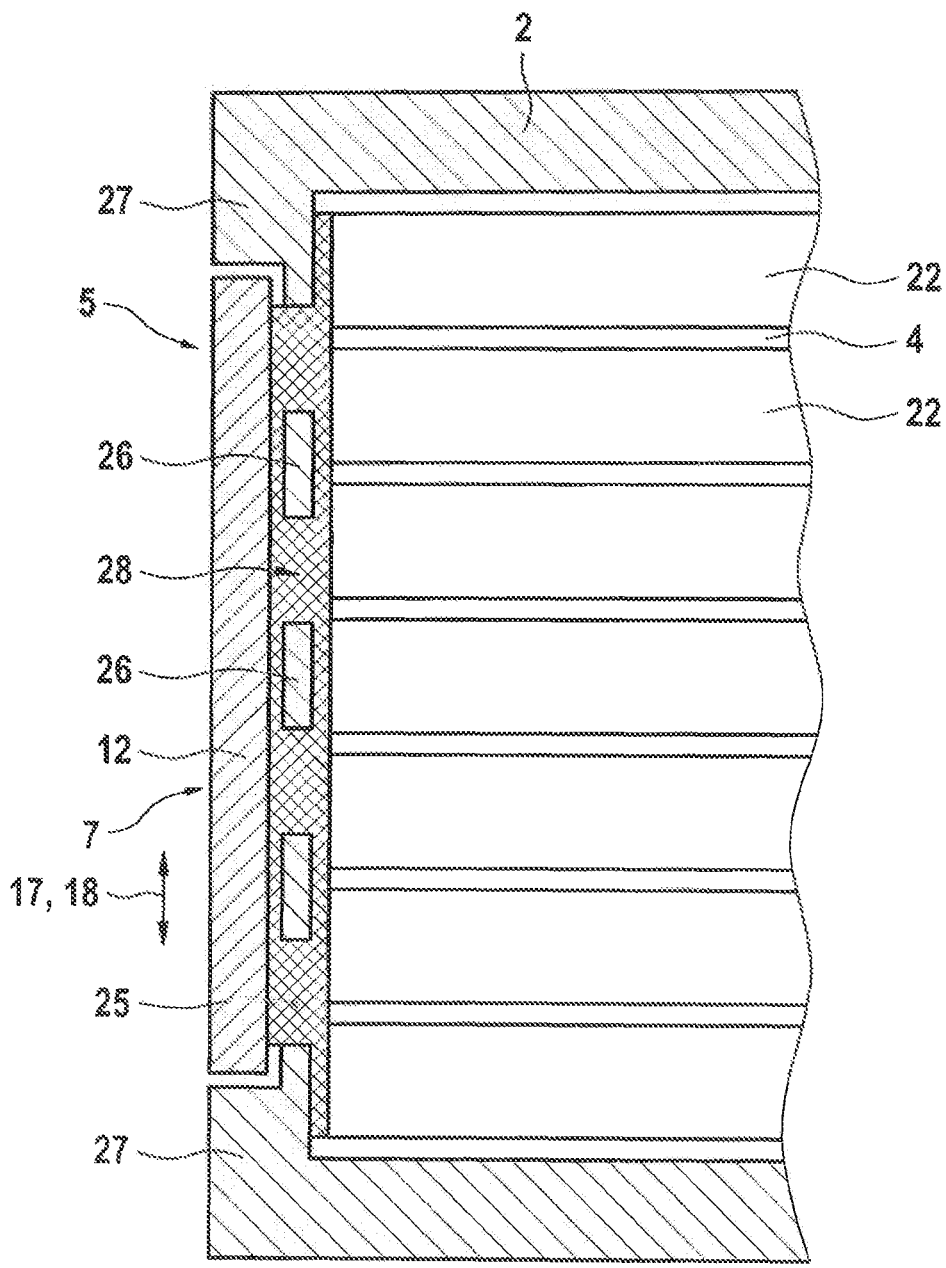

FIG. 5 shows, in a sectional view, the battery module 1 as per the further embodiment shown in FIGS. 3 and 4.

Here, FIG. 5 also shows the multiplicity of battery cells 22, which are preferably of prismatic form, and the battery module housing 2. Furthermore, a cooling element 12 is arranged in the cooling element receptacle 5 of the battery module housing 2.

The form of the cooling element receptacle 5 will now be discussed once again in detail on the basis of the illustration of FIG. 5.

The already-described housing wall 26 arranged directly adjacent to the cooling element receptacle 5 is, as already mentioned, arranged directly between the battery cells 22 and the cooling element 5, and has the openings 28 which have also already been described.

Furthermore, it is also shown in FIG. 5 that the housing wall 26 arranged directly adjacent to the cooling element receptacle 5 has a smaller wall thickness than the housing walls 27 surrounding the cooling element receptacle 5, which according to FIG. 5 are wall regions of the side wall 7 of the battery module housing 2. Here, the wall thickness describes a spacing, arranged perpendicular to the longitudinal direction 17, 18 of the cooling element 12, between the two outer surfaces of the respective housing wall 3. In this way, the cooling element receptacle 5 is thus formed as a depression, recess or aperture in one of the housing walls 3. Here, in particular, the depression, recess or aperture is formed only in one of the housing walls 3, preferably in the side wall 7. In this way, a mechanically stable battery module housing 2 can be formed.

FIG. 5 also shows that a compensation element 25 may be arranged between the cooling element 12 and battery cells 22, wherein, in this case, it is particularly advantageous if the compensation element 25 comprises a thermally conductive adhesive. A reliable mechanical arrangement of the cooling element 12 in the cooling element receptacle 5 is thus possible, wherein, at the same time, reliable thermally conductive contact is formed between the battery cells and the cooling element 12.

It is furthermore also possible, in a manner not shown in FIG. 5, for the openings 28 to be filled with a thermally conductive material, whereby thermally conductive contact can be produced between the battery cells 22 and the cooling element 5, and for the mechanical fixing of the cooling element 12 in the cooling element receptacle 5 to additionally be formed by means of an adhesive.

The invention claimed is:

1. A battery module having a battery module housing (2) having an interior space (4) defined by a multiplicity of housing walls (3),
   wherein a multiplicity of battery cells (22) is arranged in the interior space (4),
   wherein a first housing wall (26) of the multiplicity of housing walls (3) has an inner surface partially defining the interior space (4) and has an outer surface opposite the inner surface, the outer surface having therein a recess forming a cooling element receptacle (5),
   wherein a portion of the first housing wall (26) separating the recess from the interior space has therein a plurality of openings (28) communicating between the interior space (4) and the cooling element receptacle (5),
   wherein a cooling element (12) is arranged in the cooling element receptacle (5),
   wherein, between the cooling element (12) and the multiplicity of battery cells (22), there is furthermore arranged a compensation element (25), which contacts both of the cooling element (12) and the multiplicity of battery cells (22),
   wherein the compensation element (25) completely fills the plurality of openings (28), and
   wherein the compensation element separates both the cooling element and the multiplicity of battery cells from the portion of the first housing wall (26).

2. The battery module according to claim 1, characterized in that the battery module housing (2) is formed from a first material, and in that the cooling element (12) is formed from a second material which differs from the first material, wherein the second material exhibits higher thermal conductivity than the first material.

3. The battery module according to claim 1, characterized in that the cooling element (12) is connected to the cooling element receptacle (5) in cohesive fashion, and/or in positively locking fashion, and/or in non-positively locking fashion.

4. The battery module according to claim 1, characterized in that a sealing element (24) is arranged between the cooling element (12) and the cooling element receptacle (12).

5. The battery module according to claim 1, characterized in that the compensation element (25) comprises a thermally conductive adhesive or a thermally conductive sealing compound.

6. The battery module according to claim 1, characterized in that the compensation element (25) forms an interior space which can be filled with a fluid.

7. The battery module according to claim 1, characterized in that the cooling element (12, 13, 14) has at least one cooling fin (15, 16), and/or in that the cooling element (12, 19) forms at least one flow duct (20) through which a temperature-control fluid can flow, and/or in that the cooling element (12, 21) has at least one latent heat store which comprises a phase change material.

8. The battery module according to claim 1, characterized in that a compressing element presses together the multiplicity of battery cells (22) arranged in the interior space (4) of the battery module housing (2).

9. The battery module according to claim 1, characterized in that the plurality of openings (28) in the first housing wall (26) have cross-sectional areas of circular form with a diameter of in each case 2 mm to 20 mm.

10. The battery module according to claim 9, characterized in that the cross-sectional areas of circular form have a diameter of in each case 4 mm to 10 mm.

11. The battery module according to claim 1, characterized in that the battery module housing (2) is formed from a first material which is a plastic or a multi-component composite material, and in that the cooling element (12) is formed from a second material which differs from the first material and which is a metallic material, wherein the second material exhibits higher thermal conductivity than the first material.

12. The battery module according to claim 1, characterized in that the cooling element (12) is connected to the cooling element receptacle (5) in cohesive fashion, by welding or adhesive bonding, and/or in positively locking fashion, by screwed connection, clipped connection or riveted connection, and/or in non-positively locking fashion, by calking.

13. The battery module according to claim 1, characterized in that the compensation element (25) is formed from an electrically insulating material.

14. The battery module according to claim 1, characterized in that the compensation element (25) forms an interior space which is surrounded by a flexible wall and which can be filled with a fluid.

15. The battery module according to claim 1, characterized in that a tension strap presses together the multiplicity of battery cells (22) arranged in the interior space (4) of the battery module housing (2).

16. The battery module according to claim 1, wherein the compensation element (25) is formed from a thermally conductive adhesive or a thermally conductive sealing compound, and wherein the plurality of openings (28) are circular.

17. The battery module according to claim 1, characterized in that the first housing wall (26) is formed integrally with at least another of the multiplicity of housing walls (3).

18. The battery module according to claim 1 wherein the compensation element prevents contact between the first housing wall (26) and the multiplicity of battery cells (22).

19. The battery module according to claim 1 wherein an interior face extends perpendicularly from the inner surface to a portion of the outer surface defining the receptacle, wherein the interior face defines one of the plurality of openings (28), and wherein the compensation element (25) contacts the first surface, the outer surface, and the interior face.

20. The battery module according to claim 1 wherein a first space is defined between the multiplicity of battery cells (22) and the inner surface of the first housing wall (26), wherein a second space is defined between the outer surface of the first housing wall (26) and the cooling element (12), wherein the compensation element (25) fills the first space and the second space such that, along a direction extending perpendicularly from a side face of one of the multiplicity of battery cells (22), the compensation element (25) spaces apart the multiplicity of battery cells (22) from the first housing wall (26) and spaces apart the first housing wall (26) from the cooling element (12).

21. The battery module according to claim 1 wherein the first housing wall (26) connects two other walls of the multiplicity of housing walls (3).

22. The battery module according to claim 1 wherein the compensation element (25) contacts the inner surface and the outer surface of the first housing wall (26).

23. The battery module according to claim 1 wherein the plurality of openings (28) are arranged in two parallel rows along the compensation element (25).

24. The battery module according to claim 1 wherein the portion of the first housing wall (26) has solid portions between the plurality of openings (28), wherein the compensation element (25) separates the solid portions from the battery cells (22) and separates the solid portions from the cooling element (12).

25. The battery module according to claim 24 wherein a line extending perpendicularly from a side face of one of the multiplicity of battery cells (22) extends through the compensation element (25), through one of the solid portions, and through the cooling element (12).

\* \* \* \* \*